US007138736B2

(12) United States Patent
Yamamoto et al.

(10) Patent No.: US 7,138,736 B2
(45) Date of Patent: Nov. 21, 2006

(54) MOTOR (75) Inventors: Hiroaki Yamamoto, Toyohashi (JP);
Naoki Imamura, Kosai (JP); Youichi Matsuyama, Shinoshiro (JP)

(73) Assignee: Asmo Co., Ltd, Shizuoka (JP)

( * ) Notice: Subject to any disclaimer, the term of this patent is extended or adjusted under 35 U.S.C. 154(b) by 0 days.

(21) Appl. No.: 10/499,830

(22) PCT Filed: Jul. 17, 2003

(86) PCT No.: PCT/JP03/09133

§ 371 (c)(1),
(2), (4) Date: Jul. 8, 2004

(87) PCT Pub. No.: WO2004/023629

PCT Pub. Date: Mar. 18, 2004

(65) Prior Publication Data

US 2005/0082925 A1    Apr. 21, 2005

(30) Foreign Application Priority Data

Aug. 30, 2002  (JP)  ............................. 2002-252765

(51) Int. Cl.
H02K 23/06      (2006.01)
H02K 11/00      (2006.01)
H02K 5/14       (2006.01)

(52) U.S. Cl. .................. 310/71; 310/75 R; 310/DIG. 6

(58) Field of Classification Search .................. 310/71,
310/75 R, 68 R, 83, DIG. 6, 239
See application file for complete search history.

(56) References Cited

U.S. PATENT DOCUMENTS 5,063,317 A * 11/1991 Bruhn ......................... 310/91

(Continued)

FOREIGN PATENT DOCUMENTS

EP        0538 495 A1      7/1991

(Continued)

OTHER PUBLICATIONS

Office Communication issued from the Korean Patent Office issued on Jan. 27, 2006 and its translation.

(Continued)

Primary Examiner—Burton Mullins
(74) Attorney, Agent, or Firm—Posz Law Group, PLC (57) ABSTRACT An end surface portion 8a of a gear housing 8, which is located on a motor unit 2 side of the gear housing 8, is opposed to the motor unit 2 and laterally extends. A brush holder 10 includes a plate portion 13 that is opposed to the end surface portion 8a. A case 15, which receives the control circuit board 14, is formed separately from the plate portion 13. A receiving through hole, through which the circuit board receiver 15 is receivable, is formed in the plate portion 13. The case 15 is constructed to be positionable next to the yoke 5 in a state where the case 15 is received through the receiving through hole. The yoke 5, the gear housing 8, the brush holder 10, the control circuit board 14 and the case 15 are assembleable in a direction parallel to an axial direction of the motor unit 2. The control circuit board 14 projects from the gear housing 8 on the motor unit 2 side, and a projected part of the control circuit board 14, which projects from the gear housing 8 on the motor unit 2 side, is received in the case 15. In this way, in the motor that integrally includes the motor unit, the speed reducing unit and the control circuit board, the gear housing of the speed reducing unit can be made compact, and the assembly work can be simplified.

10 Claims, 5 Drawing Sheets

U.S. PATENT DOCUMENTS

| | | | |
|---|---|---|---|
| 5,283,489 A * | 2/1994 | Ochiai et al. | 310/71 |
| 5,528,093 A | 6/1996 | Adam et al. | |
| 6,201,326 B1 * | 3/2001 | Klappenbach et al. | 310/75 R |
| 6,573,625 B1 * | 6/2003 | Shimizu et al. | 310/71 |
| 6,580,194 B1 * | 6/2003 | Mizutani et al. | 310/239 |
| 6,707,183 B1 * | 3/2004 | Breynaert et al. | 310/68 B |
| 6,707,188 B1 * | 3/2004 | Torii et al. | 310/75 R |
| 6,713,913 B1 * | 3/2004 | Hager et al. | 310/89 |
| 6,756,711 B1 * | 6/2004 | Matsuyama et al. | 310/68 R |
| 6,759,783 B1 * | 7/2004 | Hager et al. | 310/239 |
| 6,787,953 B1 * | 9/2004 | Torii | 310/71 |
| 6,831,381 B1 * | 12/2004 | Ursel et al. | 310/75 R |
| 6,906,438 B1 * | 6/2005 | Ursel et al. | 310/89 |
| 6,969,933 B1 | 11/2005 | Mao et al. | 310/75 R |
| 6,998,741 B1 * | 2/2006 | Breynaert et al. | 310/68 B |
| 7,032,290 B1 * | 4/2006 | Hirano et al. | 29/596 |
| 2002/0016087 A1 | 2/2002 | Breynaert et al. | |
| 2002/0047347 A1 | 4/2002 | Torii et al. | |
| 2002/0149283 A1 | 10/2002 | Hager et al. | |

FOREIGN PATENT DOCUMENTS

| | | |
|---|---|---|
| EP | 0865 148 A1 | 2/1998 |
| EP | 1 220 425 A2 | 12/2001 |
| JP | A-2002-34207 | 1/2002 |
| JP | A-2002-078284 | 3/2002 |
| WO | WO 01/61828 A1 | 8/2001 |

OTHER PUBLICATIONS

Office Action issued from Chinese Patent Office issued on Jan. 22, 2006 for the corresponding Chinese patent application No. 038025000 (a copy and English translation thereof).

* cited by examiner

MOTOR

TECHNICAL FIELD

The present invention relates to a motor, more specifically to a motor, which integrally includes a motor unit, a speed reducing unit and a control circuit board.

BACKGROUND ART

Motors include, for example, a vehicular motor. In general, the vehicular motor includes a motor unit and a speed reducing unit, and the speed reducing unit decelerates the motor unit and is assembled integrally with the motor unit. The motor unit includes a yoke housing, which receives, for example, an armature and magnets. The speed reducing unit includes a resin gear housing, which receives a speed reducing worm mechanism that decelerates rotation transmitted from the armature.

one such motor is referred to as a smart type motor, which includes a control circuit board that controls rotation of the motor unit. There are various known motor arrangements, each of which includes the control circuit board. In one known arrangement (hereinafter, referred to as an arrangement 1), the control circuit board is received integrally in, for example, the gear housing. In another known arrangement (hereinafter, referred to as an arrangement 2), the control circuit board is modularized and is formed as a separate component, which is formed separately from the motor unit and the speed reducing unit, and the control circuit board is assembled integrally to the motor unit or to the speed reducing unit.

However, in the arrangement 1, a receiver, which receives the control circuit board, is formed integrally in the gear housing, so that a size of the gear housing is disadvantageously increased. Furthermore, the gear housing, which has the receiver for receiving the control circuit board, is not interchangeable with a gear housing of another type of motor, which does not integrally include the control circuit board, i.e., a gear housing of a normal type motor. Thus, versatility of the gear housing cannot be achieved, disadvantageously resulting in an increase in the manufacturing costs.

In the arrangement 2, assembling of the yoke housing with the gear housing is performed separately from assembling of the circuit board housing, which receives the control circuit board, with the yoke housing or the gear housing. Thus, the entire assembly work disadvantageously becomes lengthy.

The present invention addresses the above disadvantages. Thus, it is an objective of the present invention to provide a motor, which integrally includes a motor unit, a speed reducing unit and a control circuit board and which achieves a compact size of a gear housing of the speed reducing unit and achieves simplification of assembly work.

DISCLOSURE OF INVENTION

To achieve the above objective, according to a first invention, there is provided a motor including: a motor unit; a speed reducing unit that decelerates rotation of the motor unit; a control circuit board that includes a connector main body; a circuit board receiver; and a brush holder that is interposed between a yoke of the motor unit and a gear housing of the speed reducing unit, wherein: an end surface portion of the gear housing, which is located on a motor unit side of the gear housing, is opposed to the motor unit and laterally extends; the brush holder includes a plate portion that is opposed to the end surface portion of the gear housing; the circuit board receiver and the plate portion are formed separately; a receiving through hole, through which the circuit board receiver is receivable, is formed in the plate portion; the circuit board receiver is constructed to be positionable next to the yoke in a state where the circuit board receiver is received through the receiving through hole; the yoke, the gear housing, the brush holder, the control circuit board and the circuit board receiver are assembleable in a direction parallel to an axial direction of the motor unit; the control circuit board projects from the gear housing on the motor unit side; and a projected part of the control circuit board, which projects from the gear housing on the motor unit side, is received in the circuit board receiver.

According to the first invention, the projected part of the control circuit board, which projects on the motor unit side, is received in the circuit board receiver. Thus, it is not necessary to form the circuit board receiver in the gear housing, so that the gear housing can be made compact. Furthermore, the gear housing of the motor, which does not integrally include the control circuit board, i.e., the gear housing of the normal type motor is interchangeable with the gear housing of the motor of the present invention, which integrally includes the control circuit board, i.e., the gear housing of the smart type motor. Thus, the manufacturing costs of the motor can be minimized. Furthermore, the yoke, the gear housing, the control circuit board, the brush holder and the circuit board receiver, which constitute the motor, are assembleable in the common direction. Thus, the assembly work can be simplified.

Furthermore, the circuit board receiver and the brush holder are formed separately. Thus, in a case where, for example, the shape of the control circuit board needs to be changed, it is only required to change the shape of the circuit board receiver without requiring a change in the shape of the brush holder. As a result, it is easy to meet a demand for changing the design of the control circuit board in comparison to the case where the circuit board receiver and the brush holder are formed integrally.

It is preferred that a flange is formed in an end of the circuit board receiver, which is located on a gear housing side of the circuit board receiver, and the circuit board receiver is assembled by clamping the flange between the gear housing and a part of the plate portion, which is located around the receiving through hole. With this construction, the circuit board receiver is assembled by clamping the flange between the gear housing and the plate portion of the brush holder. Thus, the circuit board receiver can be easily assembled without using a dedicated securing means.

In the above structure, it is preferred that the plate portion is covered with elastomer. Sealing between the circuit board receiver and the brush holder can be easily achieved by urging the elastomer, which covers the plate portion of the brush holder, against the flange.

According to a second invention, there is provided a motor including: a motor unit; a speed reducing unit that decelerates rotation of the motor unit; a control circuit board that includes a connector main body; a circuit board receiver; and a brush holder that is interposed between a yoke of the motor unit and a gear housing of the speed reducing unit, wherein: an end surface portion of the gear housing, which is located on a motor unit side of the gear housing, is opposed to the motor unit and laterally extends; the brush holder includes a plate portion that is opposed to the end surface portion of the gear housing; the circuit board receiver and the plate portion are formed integrally; the circuit board receiver is positioned next to the yoke; the yoke, the gear housing, the brush holder and the control circuit board are assembleable in a direction parallel to an axial direction of the motor unit; the control circuit board projects from the gear housing on the motor unit side; and a projected part of the control circuit board, which projects from the gear housing on the motor unit side, is received in the circuit board receiver.

Even with the second invention, similar to the above-described first invention, it is not required to form the circuit board receiver in the gear housing. Thus, the gear housing can be made compact. Furthermore, the gear housing of the normal type motor is interchangeable with the gear housing of the smart type motor. Thus, the manufacturing costs of the motor can be minimized. Furthermore, the yoke, the gear housing, the control circuit board and the brush holder, which constitute the motor, are assembleable in the common direction. Thus, the assembly work can be simplified.

Furthermore, the circuit board receiver and the brush holder are formed integrally, so that the number of components can be reduced to reduce the manufacturing costs in comparison to the first invention where the circuit board receiver and the brush holder are formed separately.

In the first and second inventions, it is preferred that the circuit board receiver and the gear housing are positioned in a radial direction of the motor unit by engagement that uses a recess-projection relationship. The positioning of the circuit board receiver relative to the gear housing in the radial direction of the motor unit can be easily accomplished by the engagement that uses the recess-projection relationship.

According to a third invention, there is provided a motor including: a motor unit; a speed reducing unit that decelerates rotation of the motor unit; a control circuit board that includes a connector main body; and a brush holder that is interposed between a yoke of the motor unit and a gear housing of the speed reducing unit, wherein: an end surface portion of the gear housing, which is located on a motor unit side of the gear housing, is opposed to the motor unit and laterally extends; the brush holder includes a plate portion that is opposed to the end surface portion of the gear housing; the connector main body is formed to extend perpendicular to the control circuit board; a connector case, which receives the connector main body, is formed separately from the plate portion; a receiving through hole, through which the connector case is receivable, is formed in the plate portion; the connector case is constructed to be positionable next to the yoke in a state where the connector case is received through the receiving through hole; the yoke, the gear housing, the brush holder, the control circuit board and the connector case are assembleable in a direction parallel to an axial direction of the motor unit; the control circuit board is received in a receiver, which is formed in the end surface portion of the gear housing or the plate portion, in such a manner that the control circuit board is perpendicular to the axial direction of the motor unit.

According to the third invention, the control circuit board is received in the receiver, which is formed in the gear housing or the plate portion in such a manner that the control circuit board is perpendicular to the axial direction of the motor unit. It is not required to form the connector case in the gear housing, so that the gear housing can be made compact. Furthermore, the gear housing of the normal type motor is interchangeable with the gear housing of the smart type motor. Thus, the manufacturing costs of the motor can be minimized. In addition, the yoke, the gear housing, the control circuit board, the brush holder and the connector case, which constitute the motor, are assembleable in the common direction. Thus, the assembly work can be simplified.

According to a fourth invention, there is provided a motor including: a motor unit; a speed reducing unit that decelerates rotation of the motor unit; a control circuit board that includes a connector main body; a connector case that receives the connector main body; a brush holder that is interposed between a yoke of the motor unit and a gear housing of the speed reducing unit, wherein: an end surface portion of the gear housing, which is located on a motor unit side of the gear housing, is opposed to the motor unit and laterally extends; the brush holder includes a plate portion that is opposed to the end surface portion of the gear housing; the connector main body is formed to extend perpendicular to the control circuit board; a connector case, which receives the connector main body, is formed integrally with the plate portion; the connector case is positioned next to the yoke; the yoke, the gear housing, the brush holder and the control circuit board are assembleable in a direction parallel to an axial direction of the motor unit; the control circuit board is received in a receiver, which is formed in the end surface portion of the gear housing or the plate portion, in such a manner that the control circuit board is perpendicular to the axial direction of the motor unit.

According to the fourth invention, similar to the third invention, the control circuit board is received in the receiver, which is formed in the gear housing or the plate portion in such a manner that the control circuit board is perpendicular to the axial direction of the motor unit. Also, it is not required to form the connector case in the gear housing. Thus, the gear housing can be made compact. Furthermore, the gear housing of the normal type motor is interchangeable with the gear housing of the smart type motor. Thus, the manufacturing costs of the motor can be minimized. In addition, the yoke, the gear housing, the control circuit board and the brush holder, which constitute the motor, are assembleable in the common direction. Thus, the entire assembly work can be simplified. Also, the connector case and the brush holder are formed integrally. Thus, the number of components can be reduced to reduce the manufacturing costs in comparison to the third invention, in which the connector case and the brush holder are formed integrally.

In the first to fourth inventions, it is preferred that the control circuit board is assembled to the gear housing while a portion of the control circuit board is supported by the gear housing. Therefore, in a state where the gear housing is not assembled with the yoke, the brush holder and the circuit board receiver, the control circuit board can be supported by the gear housing. Thus, the motor can be assembled while the circuit board is previously assembled to the gear housing. As a result, the assembly work is further simplified in comparison to a case where the control circuit board is not supported by the gear housing.

Furthermore, it is preferred that the gear housing includes a guide portion that guides the control circuit board, which is inserted in the axial direction of the motor unit, to a predetermined position in the gear housing. With this construction, the control circuit board is positioned relative to the gear housing, so that assembly of the control circuit board to the gear housing can be more easily accomplished.

Furthermore, in the first to fourth inventions, it is preferred that the motor unit includes a rotatable shaft; the speed reducing unit includes a worm shaft, which is coaxial with the rotatable shaft and is provided separately from the rotatable shaft; and the rotatable shaft of the motor unit and the worm shaft of the speed reducing unit are integrally rotatably coupled when the motor unit is assembled with and is connected to the speed reducing unit. Therefore, in the motor, which has the rotatable shaft and the worm shaft that are integrally rotatably coupled upon assembling and connecting of the motor unit with the speed reducing unit, it is possible to achieve the compact size of the gear housing of the speed reducing unit and also to simplify assembly work of the motor.

BRIEF DESCRIPTION OF DRAWINGS

FIG. 4(*a*) is a schematic plan view showing a state where the control circuit board is installed to the gear housing of the second embodiment.

FIG. 4(*b*) is a partially fragmented schematic front view of the motor.

FIG. 5(*a*) is a partially fragmented deployed schematic view showing another example.

FIG. 5(*b*) is a partially deployed schematic view of another example.

BEST MODE FOR CARRYING OUT THE INVENTION

First Embodiment

Figure 1:
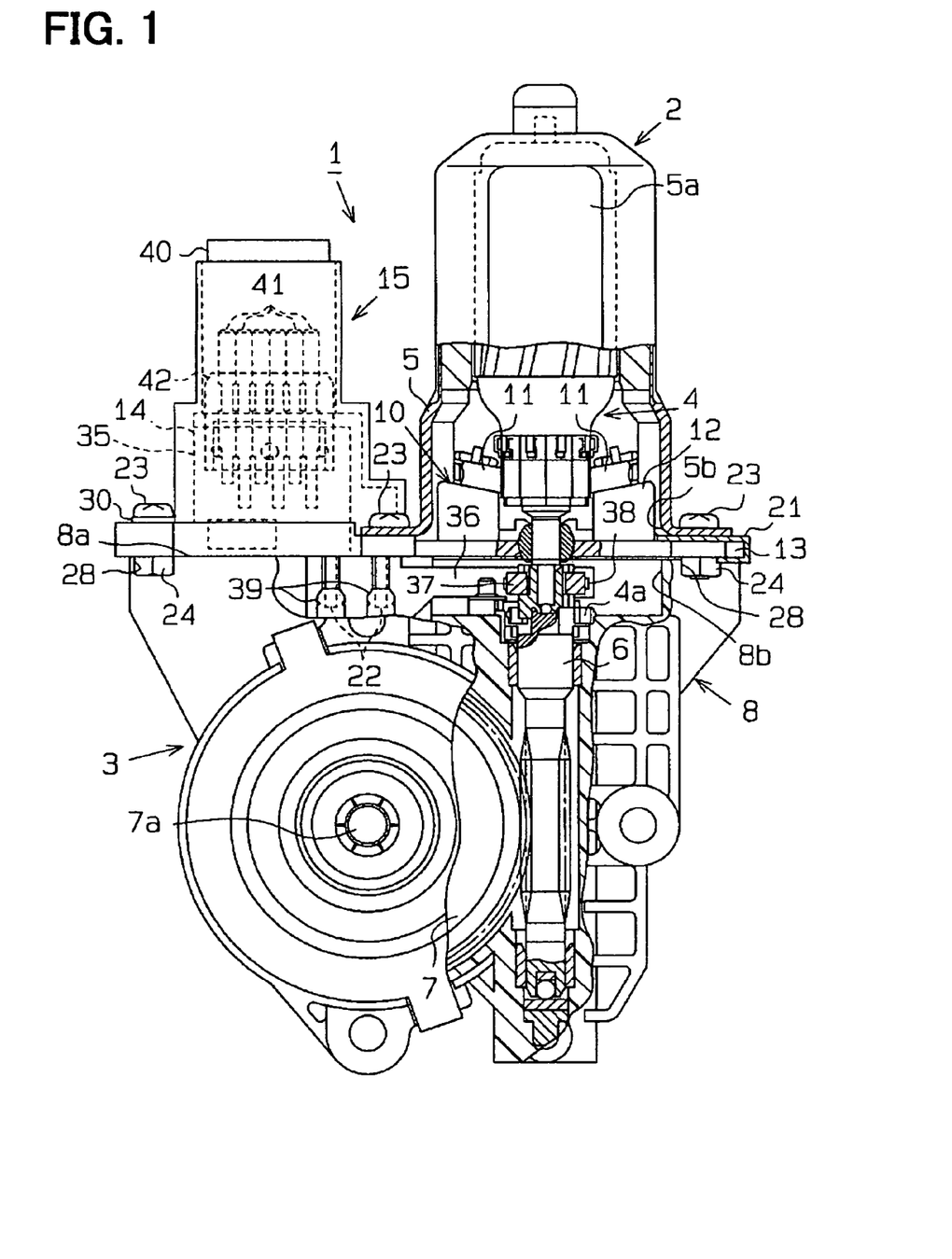
FIG. 1 is a partially fragmented schematic front view of a motor.

A first embodiment, in which the present invention is implemented in a motor that serves as a drive source of a vehicle power window system, will be described with reference to FIGS. 1 to 3. FIG. 1 is a partially fragmented schematic front view of the motor, and FIG. 2 is a partially fragmented deployed front view of the motor.

Figure 2:
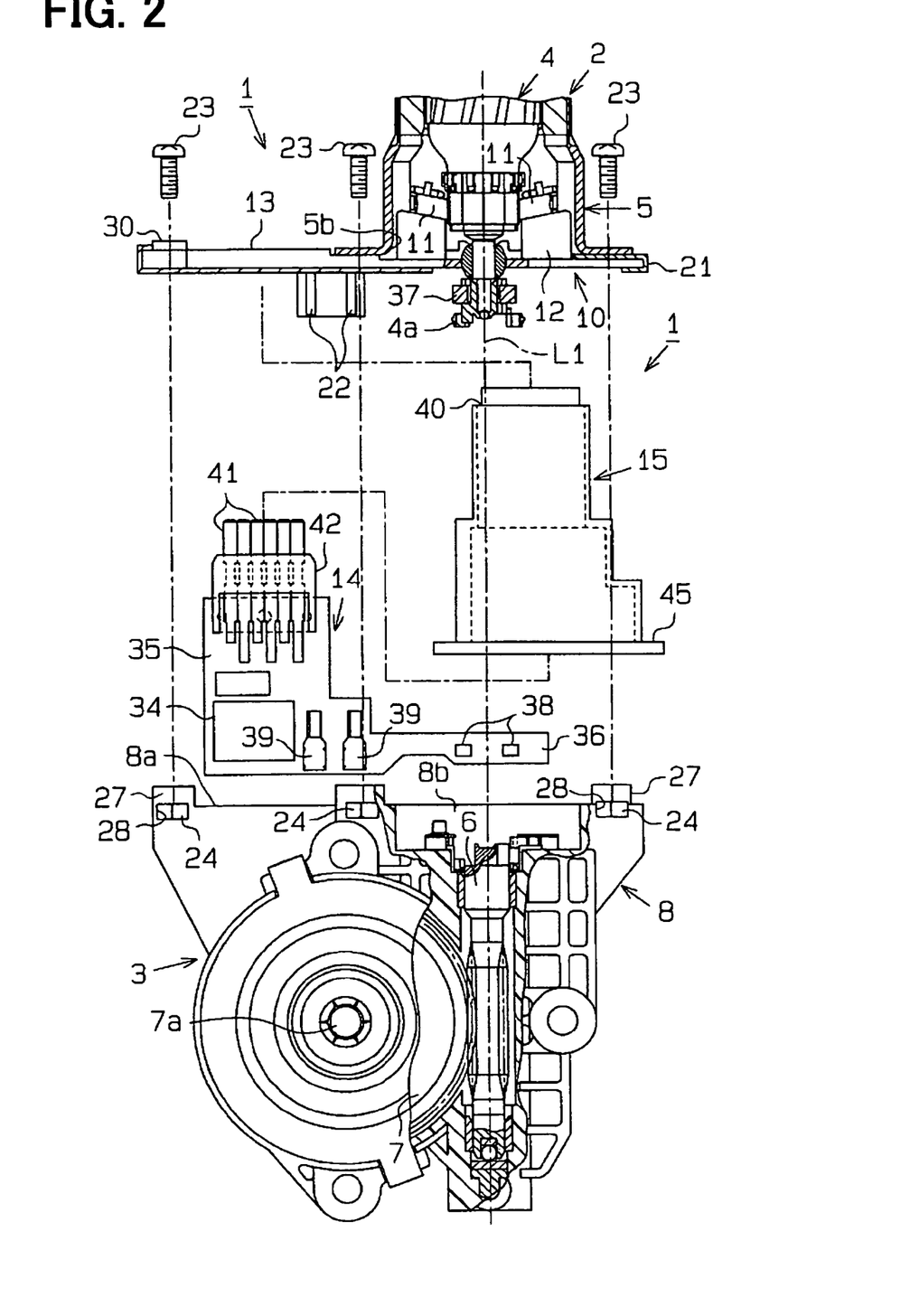
FIG. 2 is a partially fragmented deployed schematic front view of the motor.

As shown in FIGS. 1 and 2, the motor 1 includes a motor unit 2 and a speed reducing unit 3, which decelerates rotation of the motor unit 2. The motor unit 2 has a metal yoke (a yoke housing) 5, which rotatably receives an armature 4. The yoke 5 is flat and has a pair of flat portions 5*a*, which are parallel to one another (FIG. 1). The speed reducing unit 3 includes a resin gear housing 8, which rotatably receives a worm shaft 6 and a worm wheel 7. The worm shaft 6 receives rotation of a rotatable shaft of the armature 4, and the worm wheel 7 is meshed with the worm shaft 6. Rotation of the armature 4 is transmitted to the worm shaft 6 through a clutch 4*a*.

An output shaft 7*a*, which is coupled with a window regulator (not shown) of the power window system, is connected to a center of the worm wheel 7. Rotational force of the worm shaft 6 is conducted to the output shaft 7*a* through the worm wheel 7, so that the window regulator is operated to open or close a window. A motor unit 2 side end surface portion 8*a* (FIGS. 2 and 3) of the gear housing 8 is formed into a generally rectangular shape. A longitudinal length of the end surface portion 8*a* is longer than that of an opening 5*b* of the yoke 5. The end surface portion 8*a* is opposed to the motor unit 2 and laterally extends.

The motor unit 2 includes a brush holder 10, which is clamped between the yoke 5 and the gear housing 8. The brush holder 10 includes a brush holding portion 12 and a plate portion 13. The brush holding portion 12 holds a pair of brushes 11, which slidably engage a commutator of the armature 4. As shown in FIG. 3, the plate portion 13 is a generally rectangular flat plate, which is opposed to the end surface portion 8*a*, and has a size that substantially coincides with that of the end surface portion 8*a*. The plate portion 13 is made of resin and is formed integrally with the brush holding portion 12. The brush holding portion 12 is formed in one side of the plate portion 13, which corresponds to the worm shaft 6. A receiving through hole 16 (FIG. 3) is formed in the other side of the plate portion 13, which is remote from the worm shaft 6. The receiving through hole 16 receives a case 15, which serves as a circuit board receiver that receives a control circuit board 14. The case 15 is formed as a separate case, which is formed separately from the plate portion 13.

The plate portion 13 is covered with a seal member 21. The seal member 21 is made of elastomer. The seal member 21 is molded integrally with the plate portion 13 by two-color molding. The seal member 21 seals a perimeter of an opening 8*b* of the gear housing 8 and a perimeter of the opening 5*b* of the yoke 5. The seal member 21 limits intrusion of liquid (e.g., water) or dust into the opening 5*b* of the yoke 5 and the opening 8*b* of the gear housing 8.

A pair of connection terminals 22, which are electrically connected to the brushes 11, respectively, is inserted into the brush holder 10. The connection terminals 22 are power supply male terminals and are partially embedded in the brush holder 10. In the plate portion 13, the connection terminals 22 are formed at a location, which corresponds to the case 15. The connection terminals 22 extend parallel to a direction of an axis L1 on one axial side of the plate portion 13, which is opposite from the motor unit 2, i.e., extend on the side where the gear housing 8 is located.

The yoke 5 is secured to the gear housing 8 at four predetermined points by tightening screws 23 and nuts 24 while the plate portion 13 is disposed between the yoke 5 and the gear housing 8. The screws 23 and the nuts 24 secure between the yoke 5 and the gear housing 8 at two end points, which are located at a longitudinal end of the end surface portion 8*a* near the worm shaft 6, and also at two center points, which are located at a longitudinal center of the end surface portion 8*a*. Furthermore, the plate portion 13 is also secured to the gear housing 8 by screws 23 and nuts 24 at two longitudinal end points, which are located at the other longitudinal end of the end surface portion 8*a* remote from the worm shaft 6.

Figure 3:
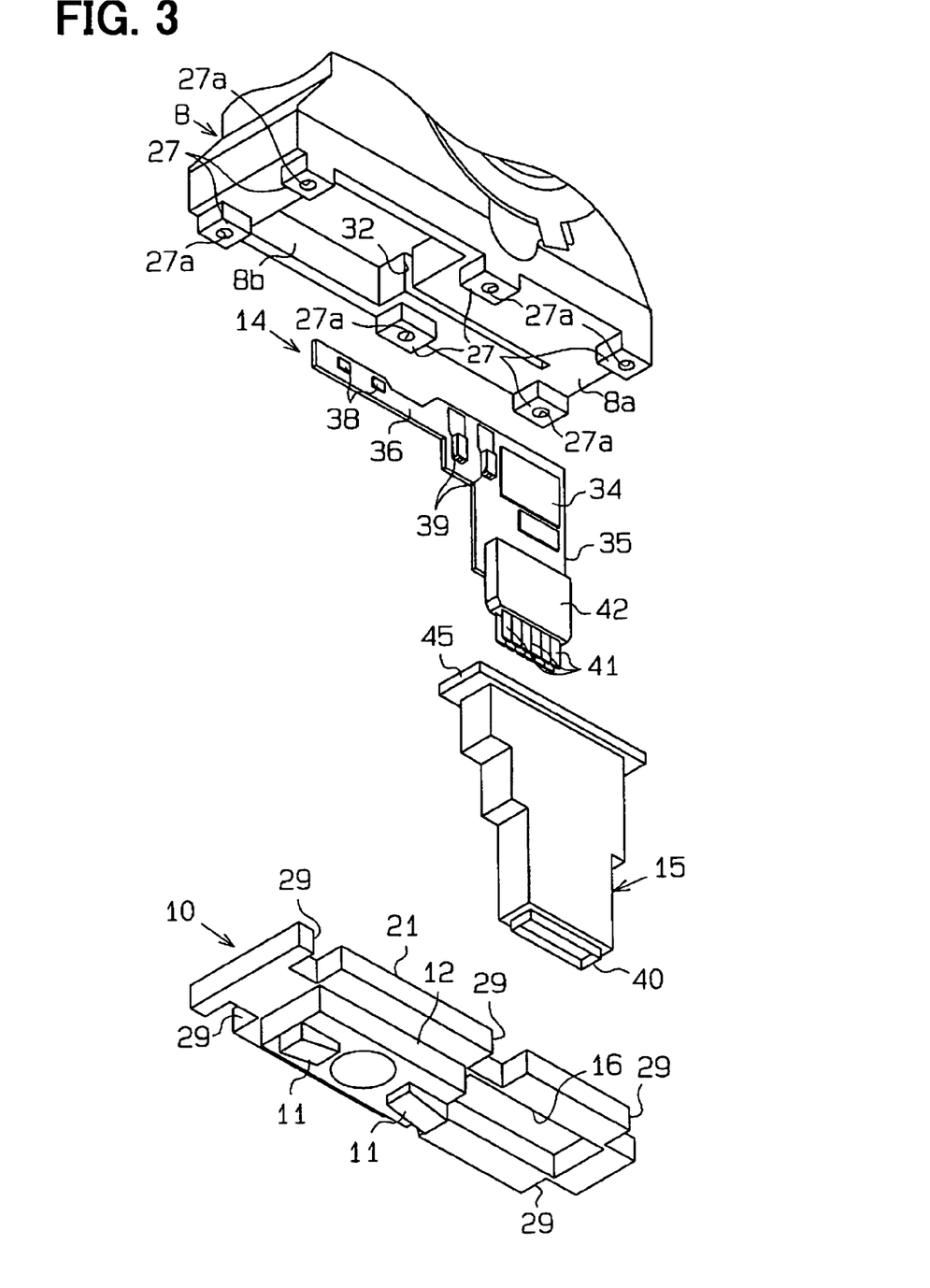
FIG. 3 is a deployed perspective schematic view showing a relationship between a gear housing and a control circuit board.

As shown in FIG. 3, the end surface portion 8*a* of the gear housing 8 includes six protrusions 27, which extend in the direction of the axis L1. Four of the protrusions 27 are formed at four corners of the end surface portion 8*a*, and the remaining two of the protrusions 27 are formed in the center of the end surface portion 8*a*. Each protrusion 27 has a screw receiving through hole 27*a*, which extends in the direction of the axis L1 to receive the corresponding screw 23. Furthermore, as shown in FIGS. 1 and 2, the gear housing 8 includes nut retaining recesses 28, which extend in a corresponding direction perpendicular to a plane of each corresponding drawing. The nut retaining recesses 28 are formed to correspond to the screw receiving through holes 27*a*, respectively. Each nut retaining recess 28 receives the corresponding nut 24 in the direction perpendicular to the plane of the drawing.

The plate portion 13 has recesses 29, which engage the protrusions 27, respectively, and are placed at locations that correspond to the screw receiving through holes 27*a*, respectively. In the present embodiment, as shown in FIG. 3, each recess 29 is formed as a notch that engages the corresponding protrusion 27. When each recess 29 engages the corresponding protrusion 27, the end surface portion 8a of the gear housing 8 is covered by the plate portion 13. At this state, when the nuts 24 are threadably engaged with the screws 23, which are inserted through the flange of the yoke 5 and are also inserted through the screw through holes 27a formed at the four points (the two end points near the worm shaft 6 and the two central points of the end surface portion 8a), the plate portion 13 is secured to the gear housing 8. Furthermore, the two screw receiving through holes 27a, which are respectively provided at the two longitudinal end points of the end surface portion 8a remote from the worm shaft 6, receive the screws 23 via a rectangular metal plate 30 (FIGS. 1 and 2) that has a pair of screw receiving through holes. The nuts 24 are threadably engaged with these screws 23 to secure the plate portion 13 to the gear housing 8.

As shown in FIG. 3, a slit 32 is formed in the end surface portion 8a of the gear housing 8 at a location that corresponds to the case 15. The slit 32 serves as a guide portion, which receives a portion of the control circuit board 14 that is inserted into the slit 32 in the axial direction of the motor unit 2 (in the direction of the axis L1 shown in FIG. 2) to guide the control circuit board 14 to a predetermined position in the gear housing 8. The slit 32 is parallel to a longitudinal direction of the end surface portion 8a of the gear housing 8. An undepicted hook, which serves as a support means for supporting the control circuit board 14, is formed in the interior of the slit 32. The portion of the control circuit board 14 is inserted into the slit 32 and is engaged with the hook, so that the control circuit board 14 is supported by the gear housing 8. In this state, the control circuit board 14 projects on the motor unit 2 side, and the projected portion of the control circuit board 14 is received in the case 15. The control circuit board 14 is arranged parallel to the flat portions 5a of the yoke 5. The one axial side of the plate portion 13, on which the motor 2 is located, will be referred to as a motor unit 2 side, and the other axial side of the plate portion 13, on which the gear housing 8 is located, will be referred to as a gear housing 8 side.

The control circuit board 14 has a control circuit 34, which controls rotation of the motor unit 2. As shown in FIG. 2, the control circuit board 14 is formed generally into an L-shape and includes a circuit board main body 35 and an elongatged extension 36. The circuit board main body 35 extends in the direction of the axis L1, and the extension 36 extends from a base of the circuit board main body 35 in the longitudinal direction of the end surface portion 8a. The base of the circuit board main body 35 of the control circuit board 14 is inserted into the slit 32 and is secured to the gear housing 8 by the undepicted hook. A sensor magnet 37, which senses rotation of the armature 4, is secured to an end of the armature 4. A pair of Hall elements 38 is secured to the extension 36 at a location that corresponds to the sensor magnet 37.

A pair of female terminals 39, which are electrically connected to the connection terminals 22, is installed to the circuit board main body 35. Each female terminal 39 has a resilient piece (not shown), which resiliently holds the inserted connection terminal 22.

A connector main body 42 is installed to an end of the circuit board main body 35. The connector main body 42 has terminals 41 of a power supply connector 40, which is connected to an undepicted vehicle side connector. The six terminals 41 are supported at corresponding predetermined positions in the connector main body 42. Each terminal 41 is electrically connected to the control circuit 34.

The control circuit board 14 is received in the case 15. The case 15 extends parallel to the direction of the axis L1. The case 15 is formed into a flat tubular body that receives the control circuit board 14. A flange 45 is formed integrally in the case 15 along a peripheral edge of a gear housing 8 side opening of the case 15. In the assembled state of the motor 1, the flange 45 is held in a transverse direction of the end surface portion 8a by the four protrusions 27, which include the two protrusions 27 at the center of the end surface portion 8a and the two protrusions 27 remote from the worm shaft 6, so that the flange 45 is positioned in the transverse direction of the end surface portion 8a.

In the state where the control circuit board 14 is received in the case 15, the terminals 41 are arranged in an opening of the case 15, which is opposite from the gear housing 8. An end of the case 15, which is opposite from the gear housing 8, form the power supply connector 40 in corporation with the connector main body 42.

Next, an assembly procedure of the motor 1 will described.

First, an assembled arrangement, in which the gear housing 8 and the control circuit board 14 are assembled together, as well as an assembled arrangement, in which the yoke 5 and the brush holder 10 are assembled together, are provided. The base of the extension 36 of the control circuit board 14 is inserted into the slit 32, and the base of the extension 36 is engaged with the undepicted hook of the gear housing 8 to support the gear housing 8. Furthermore, the brush holding portion 12 is fitted into the yoke 5.

Next, upon insertion of the case 15 through the receiving through hole 16 of the plate portion 13, the control circuit board 14 is inserted into the case 15. At this time, the gear housing 8 and the control circuit board 14 are moved relative to the yoke 5 and the brush holder 10 in the direction of the axis L1 to assemble them together. The connection terminals 22 are inserted into and are electrically connected with the corresponding female terminals 39, respectively. Then, in the state where the control circuit board 14 is received in the case 15, and the plate portion 13 is clamped between the yoke 5 and the gear housing 8, the yoke 5 and the gear housing 8 are secured by the screws 23 and the nuts 24. Furthermore, at the location remote from the worm shaft 6, the plate portion 13 and the gear housing 8 are secured through the metal plate 30 by the screws 23 and the nuts 24.

When the plate portion 13 and the case 15 are assembled, the seal member 21, which covers the plate portion 13, is compressed between the flange 45 and the plate portion 13. Removal of the case 15 in the direction of the axis L1 is limited by the clamping of the flange 45 between the gear housing 8 and the peripheral part of the plate portion 13 around the receiving through hole 16.

As described above, the motor unit 2, the gear housing 8, the brush holder 10, the control circuit board 14 and the case 15, which constitute the motor 1, are assembleable in the common direction of the axis L1. Furthermore, the portion of the control circuit board 14 is supported by the gear housing 8, and the control circuit board 14 projects on the motor unit 2 side such that the projected portion of the control circuit board 14 is received in the case 15.

In a case where the motor 1, which is assembled in the above manner, is installed in the vehicle, and the undepicted vehicle side connector is connected to the power supply connector 40, when the motor 1 is driven, drive electric power and control signals are supplied to the control circuit board 14 from the vehicle side connector through the respective terminals 41. The Hall elements 38 sense a change in a magnetic field of the sensor magnet 37, which rotates integrally with the armature 4. Then, the Hall elements 38 output the sensed signals to the control circuit 34. The control circuit 34 obtains rotation information, such as the rpm or the rotational speed of the armature 4, based on the sensed signals outputted from the Hall elements 38. Based on the above rotation information and the control signals supplied from the vehicle side through the power supply connector 40, the control circuit 34 supplies drive electric current from the female terminals 39 to the brushes 11 through the connection terminals 22 and drive the motor unit 2, so that the window regulator performs the predetermined movement.

The present embodiment provides the following advantages.

(1) The portion of the control circuit board 14 is supported by the gear housing 8, and the control circuit board 14 projects on the motor unit 2 side such that the projected portion of the control circuit board 14 is received in the case 15. Thus, it is not required to form the case 15 in the gear housing 8, so that the gear housing 8 can be made compact. Furthermore, a gear housing of a motor without the integrated control circuit board 14, i.e., a gear housing of a normal type motor is interchangeable with the gear housing 8 of the motor of the present embodiment, i.e., the smart type motor with the integrated control circuit board 14. Thus, the manufacturing costs of the motor can be minimized.

(2) The yoke 5, the gear housing 8, the brush holder 10, the control circuit board 14 and the case 15, which constitute the motor 1, are assembleable in the common direction, so that the assembly work is simplified.

(3) The case 15 and the brush holder 10 are formed separately. Thus, for example, when the shape of the control circuit board 14 needs to be changed, it is only required to change the shape of the case 15 without changing the shape of the brush holder 10. As a result, it is easy to meet a demand for changing the control circuit board 14 in comparison to the instance where the case 15 and the brush holder 10 are formed integrally.

(4) The case 15 is formed separately from the other components, such as the motor unit 2, the gear housing 8 and the brush holder 10. Furthermore, the flange 45, which is formed in the case 15, is clamped between the brush holder 10 and the gear housing 8. Thus, the case 15 can be easily assembled without using a dedicated securing means.

(5) The seal member 21, which covers the plate portion 13, is the elastomer. Thus, the sealing between the case 15 and the brush holder 10 can be easily achieved by urging the seal member 21 against the flange 45.

(6) In the non-assembled state of the gear housing 8 where the gear housing 8 is not assembled to the yoke 5, the brush holder 10 and the case 15, it is possible to support the control circuit board 14 by the hook while the control circuit board 14 is received in the slit 32 of the gear housing 8. Thus, the assembly of the motor 1 can be performed while the control circuit board 14 is previously installed to the gear housing 8. As a result, the assembly work is eased in comparison to a case where the control circuit board 14 cannot be supported by the gear housing 8.

Second Embodiment

Next, a second embodiment of the present invention will be described with reference to FIG. 4. The present embodiment mainly differs from the above embodiment in that the control circuit board is arranged perpendicular to the axial direction of the motor unit 2. The components similar to those discussed in the above embodiment will be indicated by the same numerals.

Figure 4:
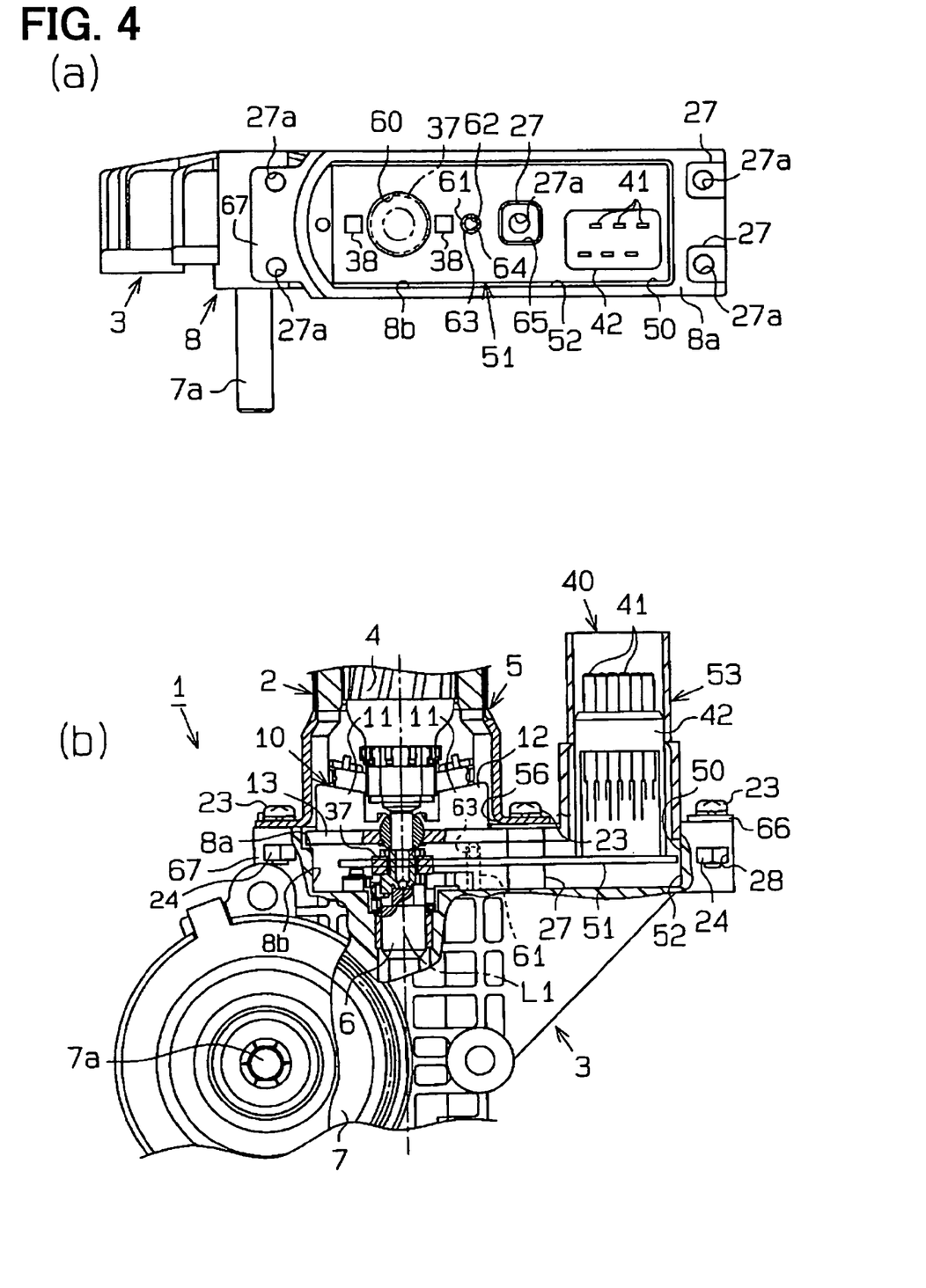

As shown in FIGS. 4(*a*) and 4(*b*), the end surface portion 8*a* of the gear housing 8 is opposed to the motor unit 2 and extends on the side opposite from the worm wheel 7. A recess 50, which is communicated with the opening 8*b*, is formed in the end surface portion 8*a* in such a manner that recess 50 extends from the opening 8*b* on the side opposite from the worm wheel 7 to receive a control circuit board 51. The opening 8*b* and the recess 50 form a receiver 52 for receiving the control circuit board 51. The control circuit board 51 has a rectangular shape and has a size that is substantially the same as that of the receiver 52. The control circuit board 51 is assembled to the gear housing 8 and is received in the receiver 52 in such a manner that the control circuit board 51 is perpendicular to the axial direction of the motor unit 2. The control circuit board 51 is assembled to the gear housing 8 by securely tightening of undepicted screws. In FIGS. 4(*a*) and 4(*b*), the components, such as the seal member 21, the connection terminals 22 and the female terminals 39, are not depicted for the sake of simplicity.

The connector main body 42 is formed to extend in a direction perpendicular to the control circuit board 51 on the side remote from the worm wheel 7. The plate portion 13 is formed to oppose the end surface portion 8*a*. A connector case 53, which receives the connector main body 42, is formed integrally with the plate portion 13 on the side remote from the worm wheel 7. A through hole 60, through which the sensor magnet 37 connected to the armature 4 is received, is formed in the control circuit board 51. The Hall elements 38 are connected to the control circuit board 51 around the through hole 60.

A positioning projection 61 is formed in the gear housing 8 at a location that is deviated from the center of the end surface portion 8*a* on the worm shaft 6 side. The positioning projection 61 serves as a guide portion, which guides the control circuit board 51 inserted in the axial direction (the direction of the axis L1) of the motor unit 2 to a predetermined position in the gear housing 8. A fitting recess 62, which extends in the axial direction, is formed in the positioning projection 61. A positioning projection 63, which can be engaged with the fitting recess 62, is formed in the plate portion 13 at a location that corresponds to the fitting recess 62. A through hole 64 is formed in the control circuit board 51 at a location that corresponds to the positioning projection 61. At the time of assembling the brush holder 10 to the gear housing 8, the positioning projection 63 is fitted into the fitting recess 62 of the positioning projection 61, which is received through the through hole 64, so that the brush holder 10 is positioned relative to the gear housing 8.

One protrusion 27, which has a screw receiving through hole 27*a*, is formed in the gear housing 8 at a location that corresponds to the center of the plate portion 13. Furthermore, a through hole 65 is formed in the control circuit board 51 at a location that corresponds to the protrusion 27. The plate portion 13 is secured to the gear housing 8 by screws 23 and nuts 24 at five positions, which include four corners and a center of the plate portion 13.

Recesses, into which the protrusions 27 are fitted, are formed in the longitudinal end of the plate portion 13, which is remote from the worm shaft 6, so that the screws 23 do not abut against the plate portion 13. A rectangular metal plate 66, which includes a pair of screw receiving through holes, is clamped between the longitudinal end of the plate portion 13 and the heads of the screws 23, so that tightening force of the screw 23 is conducted to the longitudinal end of the plate portion 13. The two screw receiving through holes 27a, which are located near the worm wheel 7, are formed in one protrusion 67.

With the above structure, at the time of assembly, the control circuit board 51 is first installed to the gear housing 8. Then, the brush holder 10 and the yoke 5 are sequentially moved in the axial direction and are assembled to the gear housing 8.

With the present embodiment, in addition to the advantage discussed in the section (2) of the previous embodiment, the following advantages can be achieved.

(7) The control circuit board 51 is received in the receiver 52 formed in the gear housing 8 in such a manner that the control circuit board 51 is perpendicular to the axial direction of the motor unit 2. Furthermore, the connector case 53 is positioned next to the motor unit 2. Thus, it is not required to form the connector case 53 in the gear housing 8, so that the gear housing 8 can be made compact. Furthermore, the gear housing of the normal type motor is interchangeable with the gear housing of the smart type motor. Therefore, the manufacturing costs of the motor can be minimized.

(8) The brush holder 10 and the connector case 53 are formed integrally. Thus, the number of the components can be reduced in comparison to the case where the brush holder and the connector case are formed separately. As a result, the manufacturing costs can be reduced.

(9) The positioning projection 61, which has the fitting recess 62, is formed in the gear housing 8, and the positioning projection 63 is formed in the plate portion 13. With this arrangement, when the brush holder 10 is assembled to the gear housing 8, the brush holder 10 is positioned relative to the gear housing 8.

The embodiments are not limited to the above respective embodiments and can be modified, for example, as follows.

The material of the seal member 21, which covers the plate portion 13, is not limited to the elastomer and can be, for example, rubber. Furthermore, the material of the seal member 21 can be a viscous material, such as butyl rubber.

The seal member 21 can be formed to cover only a surface of the plate portion 13, which is opposed to the gear housing 8.

The seal member 21 is not necessarily formed integrally with the plate portion 13. For example, the seal member 21 can be a rubber packing, which is formed separately from the plate portion 13.

Figure 5:
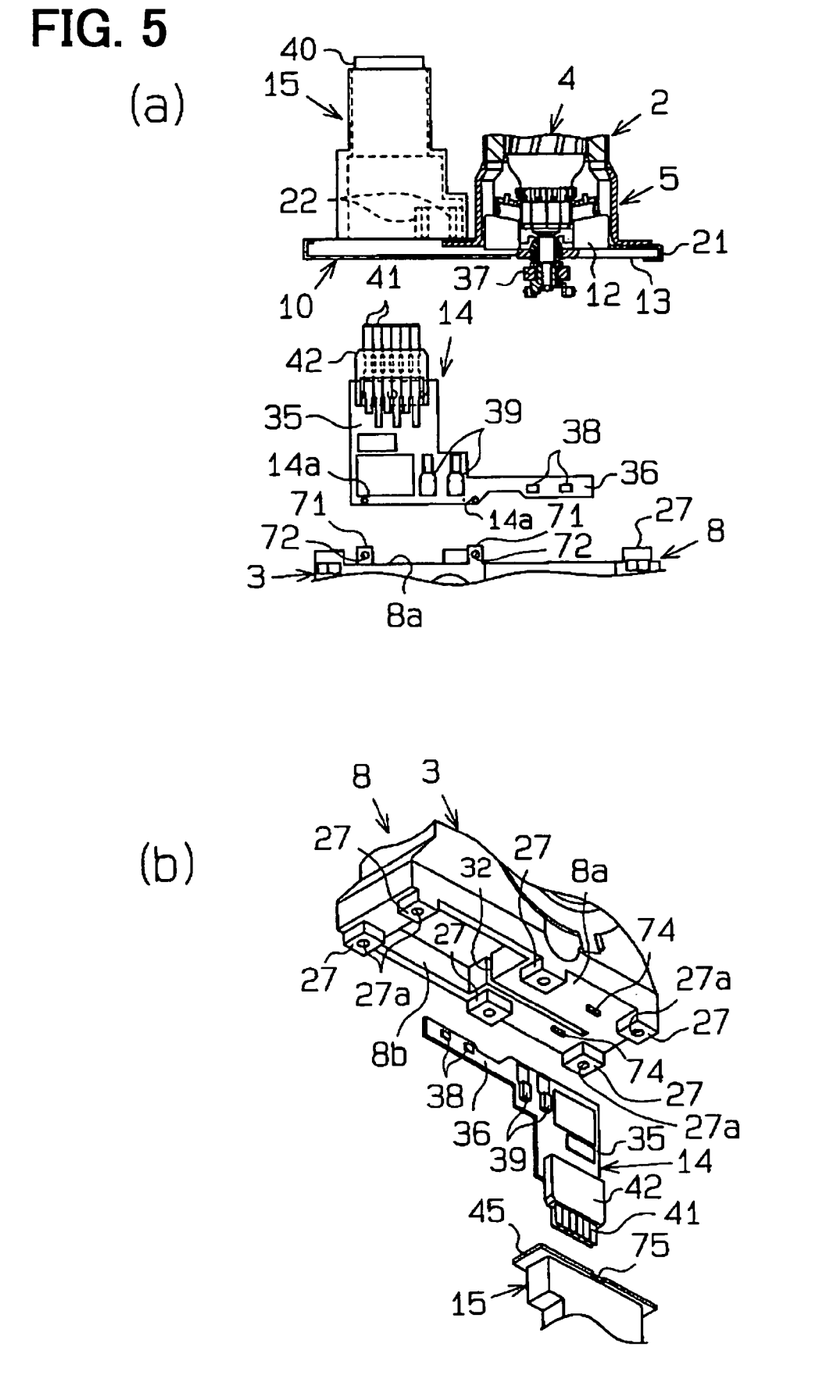

In the first embodiment, the brush holder 10 and the case 15 can be formed integrally. In this case, the number of components can be reduced in comparison to the case where the brush holder 10 and the case 15 are formed separately. Thus, the manufacturing costs can be reduced. FIG. 5(a) shows an example where the brush holder 10 and the case 15 are formed integrally.

In the first embodiment, the control circuit board 14 can be supported by the gear housing 8 through tightening of screws. For example, as shown in FIG. 5(a), screw receiving through holes 14a are formed in a base of the circuit board main body 35. The screw receiving through holes 14a are provided as one pair of screw receiving through holes 14a. Furthermore, connecting pieces 71, which axially project, are formed in the end surface portion 8a at positions, which correspond to the screw receiving through holes 14a, respectively. A screw receiving through hole 72 is formed in each connecting piece 71. When the control circuit board 14 is installed to the gear housing 8, undepicted screws are inserted through the screw receiving through holes 14a, 72 and are tightened against corresponding nuts to assemble the control circuit board 14 and the gear housing 8 together.

In this arrangement, the control circuit board 14 is not inserted into the slit 32. Thus, in comparison to the case where the control circuit board 14 is inserted into the slit 32, the control circuit board 14 further projects from the gear housing 8, and the female terminals 39 also further project from the gear housing 8. The connection terminals 22, which are connected with the female terminals 39, are received in the case 15. Since the connecting pieces 71 project from the gear housing 8, the gear housing 8 can be formed easily at the time of forming the gear housing 8 by a die. However, it is difficult to form the slit 32 through use of the die. Thus, with the above arrangement, the gear housing 8 can be more easily formed in comparison to the case where the slit 32 is formed in the gear housing 8.

In the first embodiment, the case 15 and the gear housing 8 can be positioned in the radial direction of the motor unit 2 by engagement that uses a recess-projection relationship. More specifically, for example, as shown in FIG. 5(b), a pair of fitting projections 74 is formed in the gear housing 8 between the center protrusions 27, which are located in the longitudinal center of the end surface portion 8a, and the remote protrusions 27, which are remote from the worm shaft 6. Fitting recesses 75 are formed in the flange 45 at locations that correspond to the fitting projections 74. In this case, at the time of assembling the motor 1, the fitting projections 74 are fitted with the corresponding fitting recesses 75. In this way, positioning of the case 15 relative to the gear housing 8 in the radial direction of the motor unit 2 can be easily performed.

In the second embodiment, the connector case 53 can be formed separately from the plate portion 13. For example, the receiving through hole 16 can be formed in the plate portion 13, and the flange 45 can be formed in the connector case 53. The connector case 53 can be inserted through the receiving through hole 16, and the flange 45 can be clamped between the gear housing 8 and the plate portion 13 to assemble the connector case 53.

In the second embodiment, a fitting recess can be formed in the brush holder 10 side positioning projection 63, and the gear housing 8 side positioning projection 61 can be fitted into the fitting recess of the brush holder 10 side positioning projection 63.

In the second embodiment, the positioning projections 61, 63 can be eliminated.

In the second embodiment, the installation of the control circuit board 51 to the gear housing 8 can be achieved by thermal staking or engagement of claw(s).

In the second embodiment, the receiver, which receives the control circuit board 51, can be eliminated from the gear housing 8 and can be alternatively provided in the plate portion 13.

The gear housing 8 is not required to have the arrangement that supports the control circuit board by, for example, claws or screws. For example, the control circuit board can be clamped by assembling the yoke 5 and the gear housing 8 through tightening of screws. Furthermore, the gear housing 8 and the control circuit board can be secured to one another by thermal staking.

The connection terminals 22 can be provided in the control circuit board 14, 51, and the female terminals 39 can be provided in the brush holder 10.

The present invention is not limited to the above arrangement, in which the screws 23 are inserted from the motor unit 2 side and are tightened against the nuts 24. The positional relationship of the screws 23 and the nuts 24 can be reversed. Furthermore, the screws 23 can be directly threaded into the gear housing 8. The tightening members are not limited to the screws 23, which connect between the yoke 5 and the gear housing 8 upon tightening of the screws 23, and any other tightening members can be used.

The clutch 4a can be eliminated, and the armature 4 and the worm shaft 6 can be directly connected together.

The motor 1 is not limited the drive source of the vehicle power window system and can be a drive source of any other system.

The technical ideas (invention) that are not disclosed in the above embodiment but are conceivable from the above embodiments will be described.

(1) A method for assembling a motor that includes: a motor unit; a speed reducing unit that decelerates rotation of the motor unit; a control circuit board that includes a connector main body; a circuit board receiver; and a brush holder that is interposed between a yoke of the motor unit and a gear housing of the speed reducing unit, the method being characterized by positioning the control circuit board in such a manner that the control circuit board projects from the gear housing on a motor unit side and is partially supported by the gear housing; and assembling the yoke, the gear housing, the brush holder, the control circuit board, and the circuit board receiver in a direction parallel to an axial direction of the motor unit.

(2) In the invention recited in any one of claims 1 to 5, the gear housing is constructed to support the control circuit board while the gear housing is not assembled with the yoke, the brush holder and the circuit board receiver.

As described above in detail, according to the invention recited in any one of claims 1 to 10, in the motor, which integrally includes the motor unit, the speed reducing unit and the control circuit board, the gear housing of the speed reducing unit can be made compact, and the assembly work can be simplified.

What is claimed is:

1. A motor comprising:
   a motor unit;
   a speed reducing unit that decelerates rotation of the motor unit;
   a control circuit board that includes a connector main body;
   a circuit board receiver; and
   a brush holder that is interposed between a yoke of the motor unit and a gear housing of the speed reducing unit, wherein:
   an end surface portion of the gear housing, which is located on a motor unit side of the gear housing, is opposed to the motor unit and laterally extends;
   the brush holder includes a plate portion that is opposed to the end surface portion of the gear housing;
   the circuit board receiver and the plate portion are formed separately;
   a receiving through hole, through which the circuit board receiver is receivable, is formed in the plate portion;
   the circuit board receiver is constructed to be positionable next to the yoke in a state where the circuit board receiver is received through the receiving through hole;
   the yoke, the gear housing, the brush holder, the control circuit board and the circuit board receiver are assembleable in a direction parallel to an axial direction of the motor unit;
   the control circuit board projects from the gear housing on the motor unit side; and
   a projected part of the control circuit board, which projects from the gear housing on the motor unit side, is received in the circuit board receiver.

2. The motor according to claim 1, wherein:
   a flange is formed in an end of the circuit board receiver, which is located on a gear housing side of the circuit board receiver; and
   the circuit board receiver is assembled by clamping the flange between the gear housing and a part of the plate portion, which is located around the receiving through hole.

3. The motor according to claim 2, wherein the plate portion is covered with elastomer.

4. The motor according to claim 1, wherein the circuit board receiver and the gear housing are positioned in a radial direction of the motor unit by engagement that uses a recess-projection relationship.

5. The motor according to claim 1, wherein the control circuit board is assembled to the gear housing while a portion of the control circuit board is supported by the gear housing.

6. The motor according to claim 5, wherein the gear housing includes a guide portion that guides the control circuit board, which is inserted in the axial direction of the motor unit, to a predetermined position in the gear housing.

7. The motor according to claim 1, wherein:
   the motor unit includes a rotatable shaft;
   the speed reducing unit includes a worm shaft, which is coaxial with the rotatable shaft and is provided separately from the rotatable shaft; and
   the rotatable shaft and the worm shaft are integrally rotatably coupled when the motor unit is assembled with and is connected to the speed reducing unit.

8. A motor comprising:
   a motor unit:
   a speed reducing unit that decelerate, rotation of the motor unit;
   a control circuit board that includes a connector main body, wherein a plane of the control circuit board is generally parallel to an axial direction of the motor unit;
   a circuit board receiver; and
   a brush holder that is interposed between a yoke of the motor unit and a gear housing of the speed reducing unit, wherein:
   an end surface portion of the gear housing, which is located on a motor unit side of the gear housing, is opposed to the motor unit and laterally extends;
   the brush holder includes a plate portion that is opposed to the end surface portion of the gear housing;
   the circuit board receiver and the plate portion are formed integrally;
   the circuit board receiver is positioned next to the yoke;
   the yoke, the gear housing, the brush holder and the control circuit board are assembleable in a direction parallel to the axial direction of the motor unit;
   the control circuit board projects from the gear housing on the motor unit side; and
   a projected part of the control circuit board, which projects from the gear housing on the motor unit side, is received in the circuit board receiver.

9. A motor comprising:
   a motor unit;
   a speed reducing unit that decelerates rotation of the motor unit;
   a control circuit board that includes a connector main body; and
   a brush holder that is interposed between a yoke of the motor unit and a gear housing of the speed reducing unit, wherein:

an end surface portion of the gear housing, which is located on a motor unit side of the gear housing is opposed to the motor unit and laterally extends;

the brush holder includes a plate portion that is opposed to the end surface portion of the gear housing;

the connector main body is formed to extend perpendicular to the control circuit board;

a connector case, which receives the connector main body, is formed separately from the plate portion;

a receiving through hole, through which the connector case is receivable in axial direction of the motor unit, is formed in the plate portion;

the connector case is constructed to be positionable next to the yoke in a state where the connector case is received through the receiving through hole;

the yoke, the gear housing, the brush holder, the control circuit board and the connector case are assembleable in a direction parallel to the axial direction of the motor unit;

the control circuit board is received in a receiver, which is formed in the end surface portion of the gear housing or tho plate portion, in such a manner that the control circuit board is perpendicular to the axial direction of the motor unit.

10. A motor comprising:

a motor unit;

a speed reducing unit that decelerates rotation of the motor unit;

a control circuit board that includes a connector main body, wherein a through hole penetrates through the control circuit board;

a connector case that receives the connector main body;

a brush holder that is interposed between a yoke of the motor unit and a gear housing of the speed reducing unit, wherein:

an end surface portion of the gear housing, which is located on a motor unit side of the gear housing, is opposed to the motor unit and laterally extends;

the brush holder includes plate portion that is opposed to the end surface portion of the gear housing, wherein the plate portion has one of a positioning projection and a fitting recess, which are connected with each other through the through hole of the control circuit board, and the gear housing has the other one of the positioning projection and the fitting recess;

the connector main body is formed to extend perpendicular to the control circuit board;

a connector case, which receives the connector main body, is formed integrally with the plate portion;

the connector case is positioned next to the yoke;

the yoke, the gear housing, the brush holder and the control circuit board are assembleable in a direction parallel to an axial direction of the motor unit;

the control circuit board is received in receiver, which is formed in the end surface portion of the gear housing or the plate portion, in such a manner that the control circuit board is perpendicular to the axial direction of the motor unit.

\* \* \* \* \*